United States Patent
Meiss

(10) Patent No.: US 6,582,493 B2
(45) Date of Patent: Jun. 24, 2003

(54) METHOD FOR RECYCLING OBJECTS CONSISTING OF THORIATED TUNGSTEN

(75) Inventor: Dieter Meiss, Augsburg (DE)

(73) Assignee: Patent-Treuhand-Gesellschaft für elektrische Glühlampen mbH, München (DE)

( * ) Notice: Subject to any disclaimer, the term of this patent is extended or adjusted under 35 U.S.C. 154(b) by 0 days.

(21) Appl. No.: 09/967,449

(22) Filed: Sep. 28, 2001

(65) Prior Publication Data
US 2002/0073804 A1 Jun. 20, 2002

(30) Foreign Application Priority Data

Sep. 29, 2000 (DE) .......................... 100 48 813

(51) Int. Cl.⁷ .............. B22F 1/00; B22F 3/12
(52) U.S. Cl. .............. 75/623; 419/4; 419/30; 419/38
(58) Field of Search .............. 419/30, 33, 4, 419/38; 75/623

(56) References Cited

U.S. PATENT DOCUMENTS 1,800,758 A    4/1931  Schwarzkopf
5,125,964 A    6/1992  Buerkel et al.

FOREIGN PATENT DOCUMENTS

| DE | 381 205 | 9/1923 |
| DE | 300 754 A7 | 7/1992 |
| DE | 41 16 949 C2 | 1/1993 |
| EP | 0 204 564 A2 | 12/1986 |
| EP | 0 889 006 A1 | 7/1997 |
| EP | 0 889 006 A1 | 1/1999 |

OTHER PUBLICATIONS

Kieffer, et al., "Tungsten Recycling in Todays Environment", BHM, 139 (1994) vol. 9, pp. 340–345.
Database EPODOC, CN 1053378 A (Ganzhou Tungsten Molybdenum MA (CN) ), Jul. 31, 1991, XP 002183999.

*Primary Examiner*—Daniel J. Jenkins
(74) *Attorney, Agent, or Firm*—Frishauf, Holtz, Goodman & Chick, P.C.

(57) ABSTRACT

A method for recycling thoriated tungsten objects such as thoriated tungsten scrap resulting from the fabrication of electrodes for lamps. The thoriated tungsten objects are oxidized, homogenized by mixing and chemically reduced under a hydrogen gas atmosphere to form thoriated tungsten. This method eliminates the need to separate the tungsten from its dopants. The thoriated tungsten obtained as the end product is returned to the production process and is preferably used as a raw material for the production of welding electrodes or thoriated tungsten discharge lamp electrodes.

12 Claims, No Drawings

METHOD FOR RECYCLING OBJECTS CONSISTING OF THORIATED TUNGSTEN

BACKGROUND OF THE INVENTION

The invention relates to a method for recycling objects made of thoriated tungsten without separating the radioactive thorium for disposal as radioactive waste.

The invention deals in particular with a method for recycling defective lamp parts formed of thoriated tungsten, for example electrodes of high-pressure discharge lamps, and scrap pieces of thoriated tungsten which are formed during the production of lamps, for example chips and pieces of wire. The method is also suitable for reprocessing waste thoriated tungsten materials from the production of welding electrodes. Without recycling, the thorium containing tungsten would have to be disposed of as radioactive special waste. In the present context, the term thoriated tungsten is understood as meaning tungsten which contains thorium or a thorium compound, usually thorium oxide, as an additive or dopant.

European specification EP 0 889 006 A1 discloses a method for recovering tungsten from objects made of thoriated tungsten. This recovery method involves separating the dopant thorium or thorium oxide from the tungsten which is being recycled, by means of chemical gas-phase transport. The tungsten from which dopants have been removed is suitable for use as a raw material in the manufacture of lamps.

BRIEF SUMMARY OF THE INVENTION

The object of the invention is to provide a simplified method for recycling objects formed of thoriated tungsten, for reuse, and which recycling avoids the need for (expensive) separation and disposal of radioactive thorium.

According to the invention, this object is achieved by a recycling method for objects consisting essentially of thoriated tungsten including the following method steps:

oxidation of the objects consisting essentially of thoriated tungsten to form thorium-containing or thorium-oxide-containing tungsten oxide powder, homogenization of the tungsten oxide, chemical reduction of the homogenized tungsten oxide under a hydrogen gas atmosphere to form recycled thoriated tungsten.

A major advantage of this method over the prior art, is that, in the recycling method according to the invention, there is no need to separate the thorium or thorium oxide from the tungsten. This makes the method according to the invention considerably more efficient and inexpensive than the known recycling methods which separate the tungsten from its dopants. The recycled tungsten which has impurities mostly of thorium or thorium oxide and, depending on the source of the material, various small amounts of impurities, which is formed as the end product of the recycling method according to the invention is eminently suitable as a raw material for the production of electrodes for welding equipment. Thoriated tungsten powder formed in the method according to the invention is advantageously processed into rods by pressing and sintering. Wires, preferably for use as electrodes for welding equipment, are advantageously formed from these rods by means of a conventional wire-drawing method. Given a suitable purity of the thoriated tungsten powder obtained by means of the method according to the invention, this material may also be suitable as a raw material for the manufacture of lamp electrodes.

DETAILED DESCRIPTION OF THE INVENTION

The invention is explained in more detail below on the basis of a preferred exemplary embodiment.

The invention method has the following steps:

oxidation of the objects consisting essentially of thoriated tungsten pieces to form thorium-containing or thorium-oxide-containing tungsten oxide pieces, homogenization of the tungsten oxide pieces, chemical reduction of the homogenized tungsten oxide pieces under a hydrogen gas atmosphere to form thoriated tungsten pieces.

Starting Materials

The starting material for the oxidation step is waste consisting essentially of tungsten contaminated with thorium oxide and other impurities. Starting materials include defective lamp parts of thoriated tungsten and scrap pieces or residues which are produced during the manufacture of thoriated tungsten lamp electrodes, such as for example chips, filings, wires, bars or rods and foils or sheets. The starting material is sorted according to form and, if necessary, subjected to different commutation processes depending on the form. Foils and wires will be comminuted in a shredder while rods or bars will be comminuted into granules in a suitable crusher. Preferably the pieces will be small, e.g. order of magnitude of a few microns and preferably about 1.5–2 $\mu$m to ensure a homogenous recycled product. No commutation process is required for filings. The duration of the oxidation step depends on the size of the pieces used or obtained by the commutation process.

Oxidation

The thoriated tungsten pieces which have been comminuted if required, are oxidized in air in a furnace by means of a heat treatment carried out in a temperature range between approximately 400° C. and 1200° C.

The most preferred temperature range for the oxidation step is 550° to 650° C. The oxidation step can be carried out at 600° C. for example. The duration of the oxidation step is usually about 10 hours, although this can be varied as required. In about 10 hours, the starting material is completely converted into tungsten oxide ($WO_3$) which is a yellow powder.

Homogenization and Reduction

The thorium-containing or thorium-oxide-containing tungsten oxide powder formed in this way is homogenized using any standard mixer. The homogenized powder is subjected to a chemical reduction in a rotating tubular furnace under a hydrogen gas atmosphere. The chemical reduction is carried out in a temperature range from approximately 700° C. to 1000° C. In order to save costs and energy low temperatures are preferred, for example approximately 700° C.

In a preferred embodiment, the starting material of the reduction step is tungsten oxide powder (contaminated with thorium oxide and other impurities) preferably having (or comminuted into) a grain or granule size of 1.5–2.0 $\mu$m. This is reduced under hydrogen in a rotating furnace with a length of 7 m and a diameter of 7 cm. The heating zone has a length of 5 m. The hydrogen gas can be of "technical quality". The reduction step takes about 7 hours. The powder subjected to the reduction step is kept in the furnace for about 10 hours.

The oxidation takes place in air and the reduction takes place under an atmosphere of hydrogen. The rates of flow of the hydrogen or the air over the material for the reduction or oxidation step are not critical. The duration of the processes depends on the conditions employed.

Discussion

The chemical reduction results in the formation of thoriated tungsten powder or granules, the thorium content or thorium oxide content of which can be adjusted by addition of required materials i.e. the content is reduced to the desired level by adding non-thoriated tungsten powder or increased by adding thorium oxide.

The invention process does not have the primary goal of purification. Neither the thorium oxide nor other impurities are removed from the tungsten by the oxidation or reduction step. Rather, the waste (filings, foils and rods) consisting of tungsten contaminated with thorium oxide and other impurities is converted into tungsten powder still contaminated with thorium oxide and other impurities, but in a reusable form. That is, the tungsten powder can be used again as a raw material especially for welding electrodes. Under circumstances where the scrap being recovered is relatively free of impurities, the recovered material can be used for the production of electrodes for lamps. Otherwise, the quality of the tungsten powder is usually sufficient for the production of welding electrodes.

The thoriated tungsten powder obtained by the inventive recycling method can be processed into rods and wires in the customary way. It is preferably used as a raw material for the production of electrodes for welding equipment. However, it can also be used as a raw material in the manufacture of lamps, if the thoriated tungsten residues supplied to the recycling method have a sufficiently low level of impurities or are adjusted to have low levels by addition of non-thoriated tungsten powder.

The oxidation and reduction step are required in order to obtain a homogeneous tungsten powder (contaminated with thorium oxide and other impurities) suitable as a raw material for the production of electrodes for a welding appliance for example. Due to the different form of the waste (foils, rods and filings) and the different content of dopants or impurities of the waste A it is not possible to obtain tungsten powder (contaminated with thorium oxide and other impurities) having homogeneous properties and uniform quality required for reuse, when only commutation processes are employed.

The huge advantage of the method according to the invention is that it does not require disposal of the thoriated tungsten as radioactive waste which would be very expensive nor does it require subjecting the thoriated tungsten to the more usual recovery methods which provide for a separation of the radioactive thorium from the tungsten. The present invention offers an alternative which is much cheaper than the aforesaid well known recovery methods or the disposal of the thoriated tungsten at a waste disposal plant. The method in accordance with the invention allows to capture the contaminated tungsten (contaminated by radioactive thorium oxide and by other impurities) in a cycle process. Thus, for example, welding electrodes made of the contaminated tungsten can be subjected to the recovery method at the end of their lifetime and the thoriated tungsten recovered from the spent welding electrodes can be recycled again into welding electrodes, etc.

It will be appreciated that the instant specification is set forth by way of illustration and not limitation and that various modifications and changes may be made without departing from the spirit and scope of the present invention.

What is claimed is:

1. A method for recycling objects consisting essentially of thoriated tungsten, the method including the following steps:

oxidizing the objects of thoriated tungsten to form thorium-containing or thorium-oxide-containing tungsten oxide pieces, homogenizing the thorium containing or thorium-oxide-containing tungsten oxide pieces, and chemically reducing the homogenized tungsten oxide pieces under a hydrogen gas atmosphere to form recycled thoriated tungsten.

2. The method as claimed in claim 1, further comprising comminuting the objects consisting essentially of thoriated tungsten into granules prior to the oxidation.

3. The method as claimed in claim 1, wherein the oxidation is carried out by means of a heat treatment in air at a temperature of about 400° C. to 1200° C.

4. The method as claimed in claim 1, wherein the chemical reducing of the tungsten oxide objects is carried out in a rotating tubular furnace at a temperature of about 700° C. to 1000° C.

5. The method as claimed in claim 1, wherein the thorium content of the thoriated tungsten objects is changed by adding thorium oxide or by adding non-thoriated tungsten.

6. The method as claimed in claim 1, wherein the recycling further comprises forming rods from the recycled thoriated tungsten by pressing and sintering.

7. The method as claimed in claim 6, further comprising processing the rods into wires.

8. The method as claimed in claim 1 wherein the recycling further comprises forming electrodes for a welding appliance from the recycled thoriated tungsten.

9. The method as claimed in claim 1 further comprising forming electrodes for lamps from the recycled thoriated tungsten.

10. The method of claim 1 wherein the oxidizing step is carried out at a temperature of about 400° C. to 1200° C. and the reducing step is carried out at a temperature of about 700° C. to 1000° C.

11. The method of claim 10 further comprising, before oxidizing, comminuting the objects into granules of about 1.5 to 2 $\mu$m.

12. The method of claim 1 further comprising, before oxidizing, comminuting the objects into granules of about 1.5 to 2 $\mu$m.

* * * * *